United States Patent
Nagasaka et al.

(10) Patent No.: US 9,340,207 B2
(45) Date of Patent: May 17, 2016

(54) LATERAL MANEUVER PLANNER FOR AUTOMATED DRIVING SYSTEM

(71) Applicant: Toyota Motor Engineering & Manufacturing North America, Inc., Erlanger, KY (US)

(72) Inventors: Naoki Nagasaka, Ann Arbor, MI (US); Katsuhiro Sakai, Ann Arbor, MI (US); Bunyo Okumura, Ann Arbor, MI (US); Masahiro Harada, Novi, MI (US); Nobuhide Kamata, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1 day.

(21) Appl. No.: 14/156,893

(22) Filed: Jan. 16, 2014

(65) Prior Publication Data
US 2015/0197246 A1    Jul. 16, 2015

(51) Int. Cl.
| | |
|---|---|
| *B60W 30/00* | (2006.01) |
| *B60W 30/10* | (2006.01) |
| *G01C 21/26* | (2006.01) |
| *G05D 1/02* | (2006.01) |
| *B62D 15/02* | (2006.01) |

(52) U.S. Cl.
CPC .......... *B60W 30/10* (2013.01); *B62D 15/025* (2013.01); *G01C 21/26* (2013.01); *G05D 1/0231* (2013.01); *G05D 2201/0213* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,675,094 B2* | 1/2004 | Russell | ................. | G01S 13/931 701/301 |
| 7,102,496 B1* | 9/2006 | Ernst, Jr. | ................ | G08G 1/164 180/167 |
| 7,124,027 B1* | 10/2006 | Ernst, Jr. | ............... | B60W 30/09 340/435 |
| 8,346,480 B2* | 1/2013 | Trepagnier | ........... | B60W 30/00 180/167 |
| 8,392,104 B2* | 3/2013 | Nishira | ..................... | B60T 7/22 180/280 |
| 8,457,892 B2* | 6/2013 | Aso | ....................... | B60W 30/10 701/400 |
| 8,473,144 B1* | 6/2013 | Dolgov | .............. | B60W 30/095 348/119 |
| 2002/0049539 A1* | 4/2002 | Russell | ................. | G01S 13/931 701/301 |
| 2006/0085131 A1* | 4/2006 | Yopp | .................. | B60W 30/085 701/301 |
| 2009/0204304 A1* | 8/2009 | Urban | .................. | B60W 40/04 701/96 |
| 2010/0131142 A1* | 5/2010 | Deng | ....................... | B60T 7/18 701/65 |

(Continued)

FOREIGN PATENT DOCUMENTS

| | | |
|---|---|---|
| KR | 1133037 B1 | 4/2012 |
| WO | 2012/117044 A2 | 9/2012 |

*Primary Examiner* — Jonathan L Sample
(74) *Attorney, Agent, or Firm* — Christopher G. Darrow; Darrow Mustafa PC

(57) ABSTRACT

A system, device, and methods of automated driving are disclosed. One example method includes determining one or more potential vehicle paths based on information specific to the environment surrounding a vehicle and receiving an indication classifying one or more objects proximate to the one or more potential vehicle paths as an object of interest based on input received from one or more sensors disposed on the vehicle. The method further includes selecting a preferred vehicle path from the one or more potential vehicle paths based on properties of the one or more objects of interest and sending a command, to one or more vehicle systems, to control the vehicle to follow the preferred vehicle path.

24 Claims, 5 Drawing Sheets

(56) References Cited

U.S. PATENT DOCUMENTS

| | | | | |
|---|---|---|---|---|
| 2010/0235088 A1* | 9/2010 | Li | ............ | G05D 1/0214 701/533 |
| 2010/0256836 A1* | 10/2010 | Mudalige | ............ | G08G 1/22 701/2 |
| 2010/0256852 A1* | 10/2010 | Mudalige | ............ | G08G 1/22 701/24 |
| 2010/0292886 A1* | 11/2010 | Szczerba | ............ | G01C 21/365 701/31.4 |
| 2011/0098922 A1* | 4/2011 | Ibrahim | ............ | B60W 40/08 701/532 |
| 2012/0150444 A1* | 6/2012 | Hong | ............ | G01C 21/3461 701/533 |
| 2012/0283907 A1* | 11/2012 | Lee | ............ | B60T 8/17557 701/31.9 |
| 2013/0142385 A1* | 6/2013 | Mathieu | ............ | G01C 21/365 382/103 |
| 2013/0338868 A1* | 12/2013 | Essame | ............ | B60W 30/18163 701/23 |
| 2014/0162219 A1* | 6/2014 | Stankoulov | ............ | G09B 19/167 434/65 |

* cited by examiner

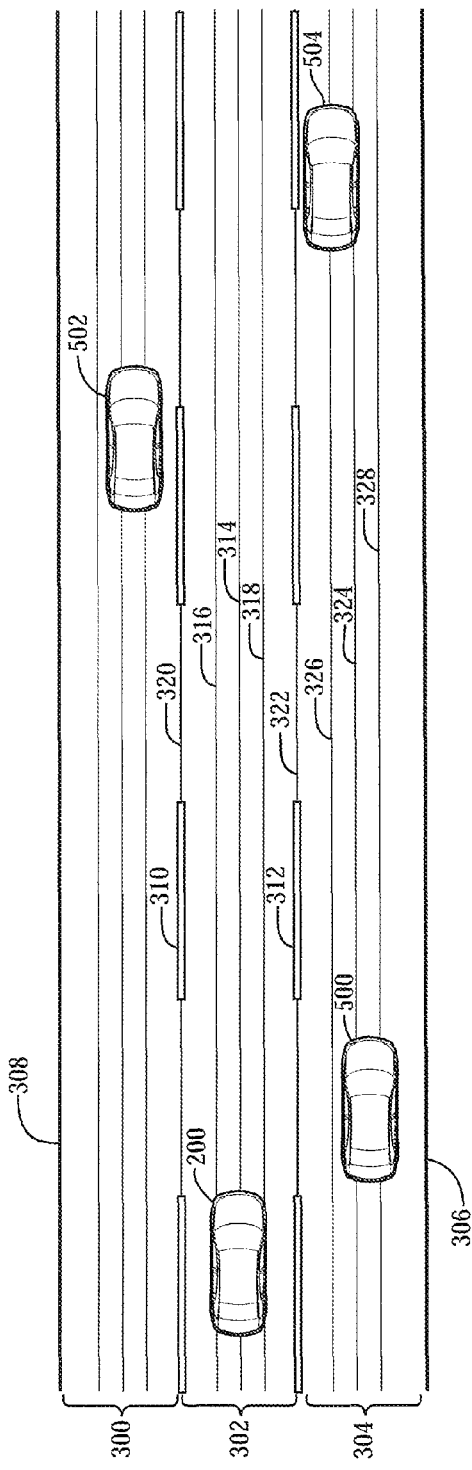
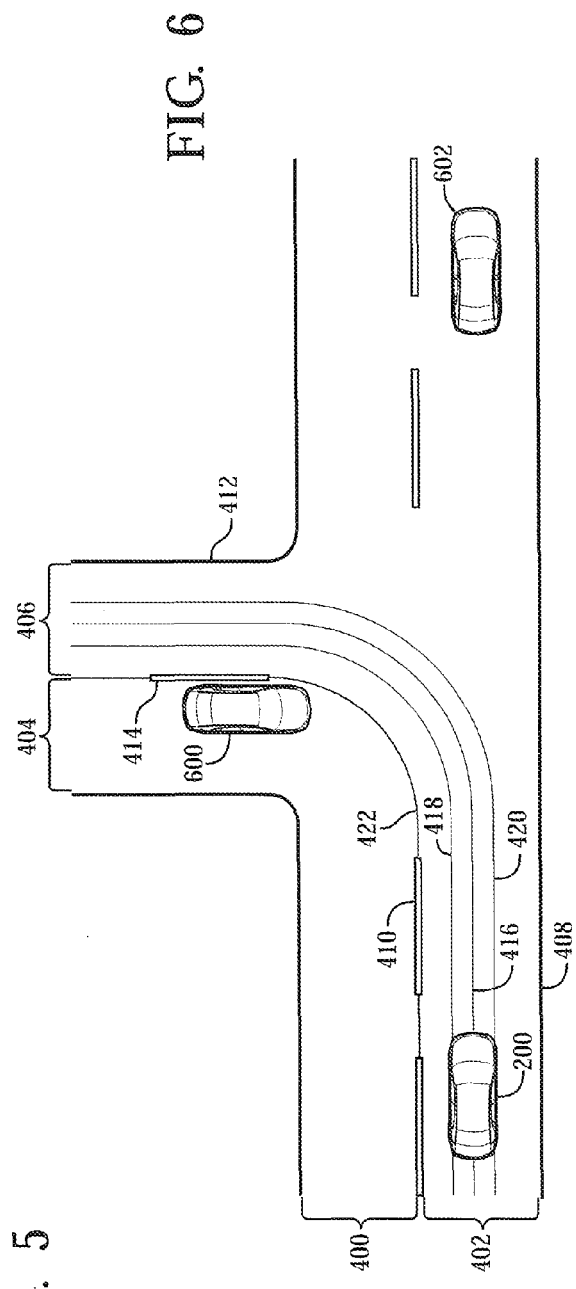

LATERAL MANEUVER PLANNER FOR AUTOMATED DRIVING SYSTEM

BACKGROUND

Partially-automated or monitored driving systems are designed to assist drivers in operating a vehicle safely and efficiently on the road, for example, using techniques such as eye-tracking of the driver to send a warning when the driver becomes inattentive, lane tracking of the vehicle to send a warning to the driver when the vehicle is leaving its lane, and controlling vehicle velocity based on distance to a vehicle ahead of the driver when adaptive cruise control is activated by the driver. Fully automated driving systems are designed to operate a vehicle on the road without driver interaction or other external control, for example, self-driving vehicles.

SUMMARY

An automated driving system can be described as a system that can operate a vehicle on the road without driver interaction. The automated driving system described here can autonomously operate the vehicle based on the physical features of the driving environment surrounding the vehicle. The physical features of the driving environment can include both the navigation route to be followed by the vehicle based on map information as well as the relevant objects of interest, such as other vehicles, that influence which predetermined potential vehicle path along the navigation route would be the preferred vehicle path to follow for the vehicle. Only those objects most relevant to the navigation route of the vehicle need to be considered in choosing the preferred vehicle path.

In one implementation, an automated driving system is disclosed. The system includes one or more sensors disposed on a vehicle and a computing device in communication with the one or more sensors. The computing device includes one or more processors for controlling the operations of the computing device and a memory for storing data and program instructions used by the one or more processors. The one or more processors are configured to execute instructions stored in the memory to: determine, based on information specific to the environment surrounding the vehicle, one or more potential vehicle paths; receive, based on input from the one or more sensors disposed on the vehicle, an indication classifying one or more objects proximate to the one or more potential vehicle paths as an object of interest; select, based on properties of the one or more objects of interest, a preferred vehicle path from the one or more potential vehicle paths; and send a command, to one or more vehicle systems, to control the vehicle to follow the preferred vehicle path.

In another implementation, a computer-implemented method of automated driving is disclosed. The method includes determining, based on information specific to the environment surrounding a vehicle, one or more potential vehicle paths; receiving, based on input received from one or more sensors disposed on the vehicle, an indication classifying one or more objects proximate to the one or more potential vehicle paths as an object of interest; selecting, based on properties of the one or more objects of interest, a preferred vehicle path from the one or more potential vehicle paths; and sending a command, to one or more vehicle systems, to control the vehicle to follow the preferred vehicle path.

In another implementation, a computing device is disclosed. The computing device includes one or more processors for controlling the operations of the computing device and a memory for storing data and program instructions used by the one or more processors. The one or more processors are configured to execute instructions stored in the memory to: determine, based on information specific to the environment surrounding a vehicle, one or more potential vehicle paths; receive, based on input received from one or more sensors disposed on the vehicle, an indication classifying one or more objects proximate to the one or more potential vehicle paths as an object of interest; select, based on properties of the one or more objects of interest, a preferred vehicle path from the one or more potential vehicle paths; and send a command, to one or more vehicle systems, to control the vehicle to follow the preferred vehicle path.

BRIEF DESCRIPTION OF THE DRAWINGS

The description herein makes reference to the accompanying drawings wherein like reference numerals refer to like parts throughout the several views, and wherein:

FIG. 5 shows a plurality of objects proximate to the set of potential vehicle paths of FIG. 3 and the vehicle of FIG. 2;

FIG. 6 shows a plurality of objects proximate to the set of potential vehicle paths of FIG. 4 and the vehicle of FIG. 2;

DETAILED DESCRIPTION

An automated driving system for a vehicle is disclosed. In operating the vehicle autonomously, the automated driving system can be configured to determine one or more potential vehicle paths for the vehicle to follow along a navigation route based on information specific to the environment surrounding the vehicle, for example, based on map information and lane information. The automated driving system can also be configured to receive indications classifying one or more objects proximate to the vehicle as objects of interest based on input from sensors disposed on the vehicle. Based on the properties of the objects of interest, such as the relative location and speed of the objects of interest in respect to the vehicle, the automated driving system can select a preferred vehicle path from the one or more potential vehicle paths and send a command to control the vehicle to follow the preferred vehicle path.

Figure 1:
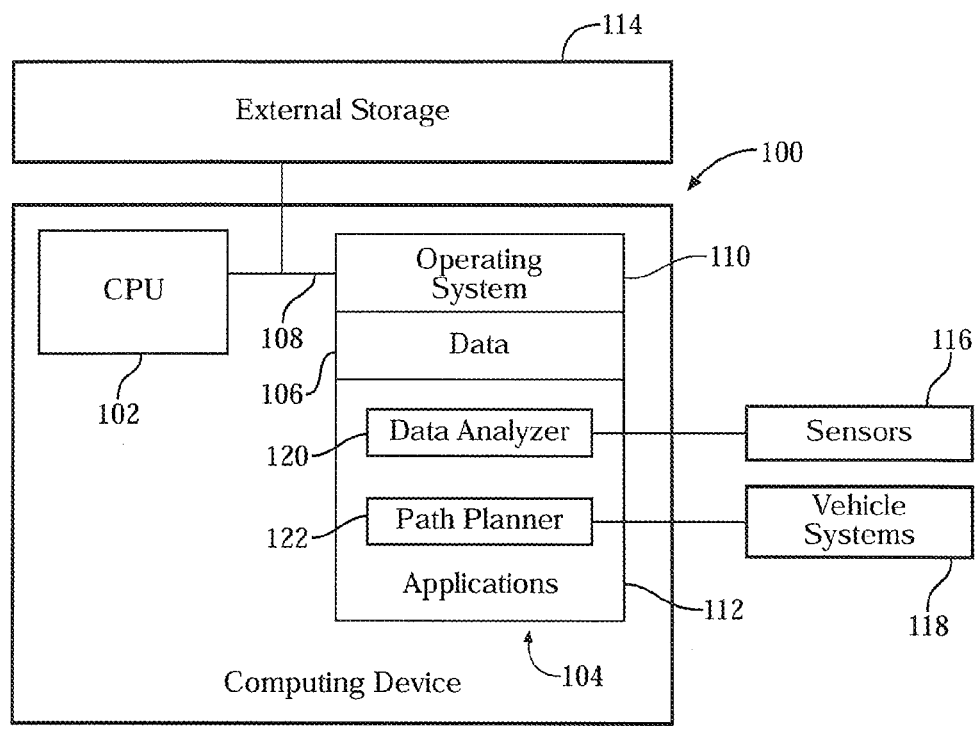
FIG. 1 is a block diagram of a computing device for implementing an automated driving system.

FIG. 1 is a block diagram of a computing device 100 for implementing the automated driving system. The computing device 100 can be any type of vehicle-installed, handheld, desktop, or other form of single computing device, or can be composed of multiple computing devices. The processing unit in the computing device can be a conventional central processing unit (CPU) 102 or any other type of device, or multiple devices, capable of manipulating or processing information. The memory 104 in the computing device can be a random access memory device (RAM) or any other suitable type of storage device. The memory 104 can include data 106 that is accessed by the CPU using a bus 108.

The memory 104 can also include an operating system 110 and installed applications 112, the installed applications 112 including programs that permit the CPU 102 to perform the automated driving methods described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be coupled to one or more sensors 116. The sensors 116 can capture data and/or signals for processing by an inertial measurement unit (IMU), a dead-reckoning system, a global navigation satellite system (GNSS), a light detection and ranging (LIDAR) system, a radar system, a sonar system, an image-based sensor system, or any other type of system capable of capturing information specific to the environment surrounding a vehicle, including information specific to objects such as other vehicles proximate to the navigation route of the vehicle, pedestrians, features of the route being travelled by the vehicle, or other localized position data and/or signals and outputting corresponding data and/or signals to the CPU 102.

The sensors 116 can also capture data representative of changes in x, y, and z-axis position, velocity, acceleration, rotation angle, and rotational angular rate for the vehicle and similar data for objects proximate to the navigation route of the vehicle. If the sensors 116 capture data for a dead-reckoning system, data relating to wheel revolution speeds, travel distance, steering angle, and steering angular rate of change can be captured. If the sensors 116 capture signals for a GNSS, a receiver can calculate vehicle position and velocity estimated in global coordinates. A plurality of satellites can be used to estimate the vehicle's position and velocity using three-dimensional triangulation and time estimation.

If the sensors 116 capture data for a LIDAR system, ranging data relating to intensity or reflectivity returns of the environment surrounding the vehicle can be captured. In the examples described below, the sensors 116 can capture, at least: data for a dead-reckoning system or other system that estimates vehicle velocity, acceleration, deceleration, position, and orientation; signals for a GNSS or other system that determines vehicle position and velocity; and data for a LIDAR system or other system that measures vehicle distance from lane lines (e.g., route surface markings or route boundaries), obstacles, objects, or other environmental features including traffic lights and road signs.

The computing device 100 can also be coupled to one or more vehicle systems 118. The vehicle systems 118 can include various vehicle controllers and actuators. Each vehicle controller can be configured to send commands to one or more vehicle actuators. For example, one vehicle controller can be a propulsion controller configured to send a command to a vehicle actuator, e.g. the engine throttle, to move the position of a throttle plate based on the position of an accelerator pedal. In another example, the vehicle actuators can be part of a traction control system or a hybrid control system. As another example, one vehicle controller can be an electronic stability controller configured to send a command to activate one of the front or rear brakes if either more or less yaw motion (rotation around the vehicle's vertical axis) is detected than optimum for the current angle of the steering wheel. The vehicle systems 118 can also be in communication with the sensors 116, the sensors 116 being configured to capture data indicative of performance of the vehicle systems 118.

In the example computing device 100 described in FIG. 1, the applications 112 stored in the memory 104 include at least a data analyzer 120 and a path planner 122. Each of these applications 112 are described in additional detail below. In general, data captured by the sensors 116 can be used by one or more of these applications 112 to understand the environment surrounding the vehicle, plan one or more potential vehicle paths for autonomous operation of the vehicle along a navigation route for the vehicle, improve positional accuracy of the vehicle, and send commands to the various vehicle systems 118 to change the current operating characteristics of the vehicle.

Figure 2:
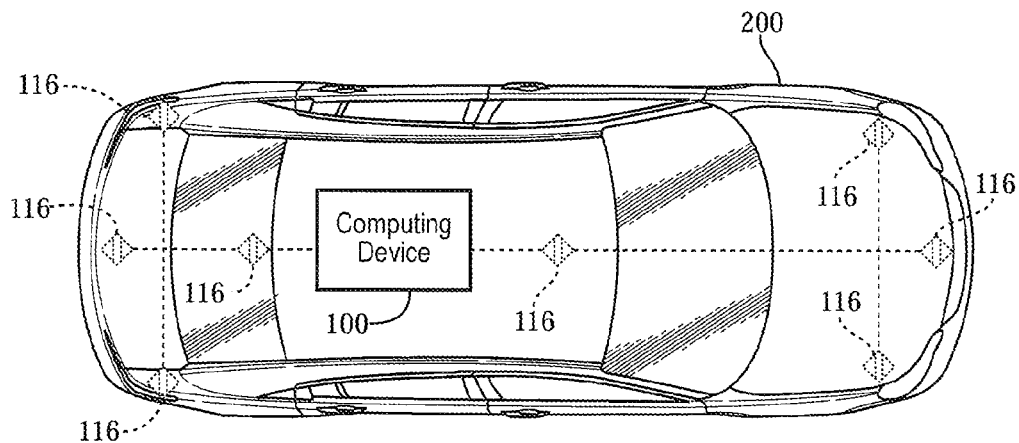
FIG. 2 is a schematic illustration of a vehicle including the computing device of FIG. 1.

FIG. 2 shows a schematic of a vehicle 200 including the computing device 100 described in FIG. 1. The computing device 100 can be located within the vehicle 200 as shown in FIG. 2 or can be located remotely from the vehicle 200 in an alternate location (not shown). If the computing device 100 is located remotely from the vehicle, the vehicle 200 can include the capability of communicating with the computing device 100.

The vehicle 200 can also include a plurality of sensors, such as the sensors 116 described in reference to FIG. 1. One or more of the sensors 116 shown can be configured to capture changes in velocity, acceleration, wheel revolution speed, and distance to objects within the surrounding environment for use by the computing device 100 to estimate position and orientation of the vehicle, steering angle for a dead-reckoning system, images for processing by an image sensor, vehicle position in global coordinates based on signals from a plurality of satellites, or any other data and/or signals that could be used to determine the current state of the vehicle or determine the position of the vehicle 200 in respect to its environment.

For example, if the sensors 116 are configured to capture data for use by a LIDAR system, the sensors 116 can capture data related to laser returns from physical objects in the area surrounding the vehicle 200 with ranging distances calculated by measuring the time it takes for a signal to return to the sensor 116. Laser returns can include the backscattered light reflected by objects hit by a source of light, e.g. laser light, being emitted by the sensors 116 or another source on or proximate to the vehicle 200. Once the light is reflected by an object, the sensors 116 can capture intensity values and reflectivity of each point on the object to be used for analyzing and classifying the object, for example, by the data analyzer 120, one of the applications 112 stored within or accessible to the computing device 100.

The data analyzer 120 briefly described in FIG. 1 can analyze data and/or signals captured by the one or more sensors 116 by, for example, filtering noise, extracting features for clustering, and/or classifying and tracking objects. The data analyzer 120 can process data from the one or more sensors 116 such that the data is configured for use by the other various applications 112 used to implement the automated driving system, such as the path planner 122. The path planner 122 can be configured to determine the navigation route for the vehicle 200 to follow based on the current vehicle 200 location in respect to the surrounding environment as well as any points of destination chosen, for example, by the driver of the vehicle 200. The path planner 122 can thus determine the navigation route for the vehicle based on data received from the data analyzer 120.

Figure 3:
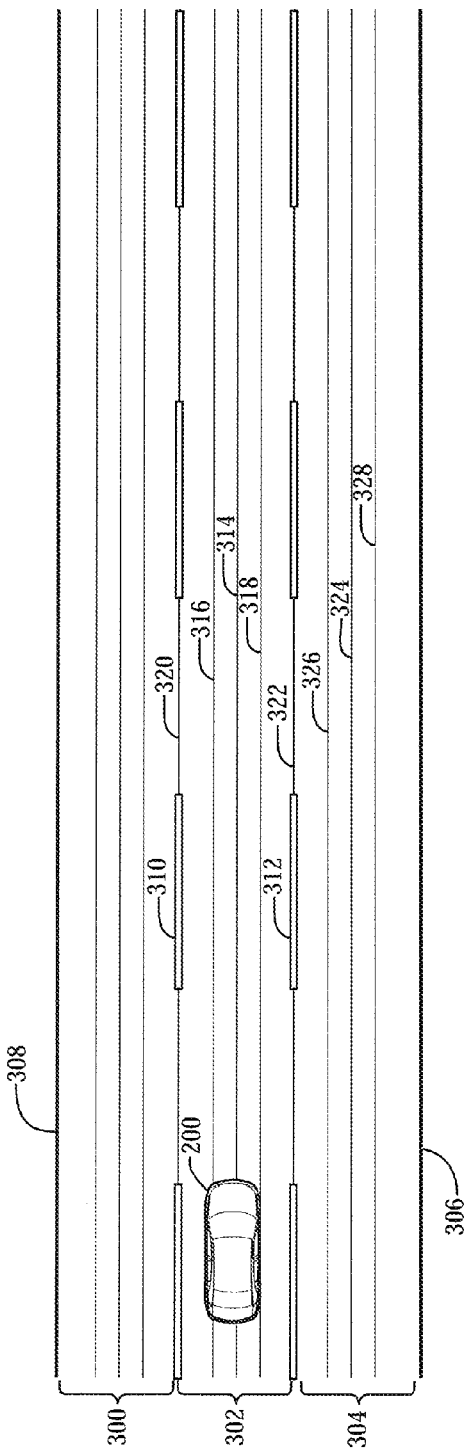
FIG. 3 shows an example portion of a navigation route being traversed by the vehicle of FIG. 2 and an example set of potential vehicle paths along the portion of the navigation route.

FIG. 3 shows an example portion of a navigation route being traversed by the vehicle 200 of FIG. 2 and an example set of potential vehicle paths along the portion of the navigation route. The example navigation route shown in FIG. 3 includes three lanes 300, 302, 304. Each of the lanes 300, 302, 304 is formed between lane edge features, such as a curb 306 at the bottom edge of lane 304, a solid lane marking 308 at the top edge of lane 300, and dashed lane markings 310, 312 forming the top and bottom edges of lane 302 as well as the bottom edge of lane 300 and top edge of lane 304, respectively. These lane features can be recognized by the path planner 122 using map information corresponding to the location of the vehicle 200 and confirmed by data captured by the sensors 116 disposed on the vehicle 200 and compared to the map information. The map information can be stored in the memory 104 of the computing device 100 or can be available to the path planner 122 from a remote location. In the example navigation route of FIG. 3, the data analyzer 120 and path planner 122 can determine that the three example lanes 300, 302, 304 are designed for vehicular travel in the same direction and that the vehicle 200 and other objects, such as other vehicles, may transfer between the lanes 300, 302, 304 along the portion of the navigation route.

The data analyzer 120 and path planner 122 can also use lane information available as part of the map information or as captured by the sensors 116, such as lane edge features, number of lanes, and overall width of the lanes, to predetermine sets of potential vehicle paths before the vehicle 200 encounters a given portion of the navigation route. The map information, can, for example, be built from data collected using a LIDAR sensor and manipulated using a simultaneous localization and mapping (SLAM) technique to build the map. The map information can also be gathered from a route network definition file (RNDF) or other source. The potential vehicle paths can be determined using a numerical optimization technique. Each of the lanes 300, 302, 304 shown in FIG. 3 includes four or five predetermined potential vehicles paths chosen based on the features present within the map information.

For example, lane 302 includes five potential vehicles paths. Potential vehicle path 314 lies along the center of the lane 302 as it exists between lane markings 310, 312, and the vehicle 200 is shown as currently traversing this potential vehicle path 314. Potential vehicle paths 316, 318 are predetermined as offsets from lane markings 310, 312. The amount of offset can be based on the type of lane feature from which the predetermined path is to be spaced. In the example of potential vehicle paths 316, 318, the offset value is based on the lane information that indicates that lane markings 310, 312 are dotted lines serving as the edges of the lane 302. Lane 302 also includes potential vehicle paths 320, 322 which are positioned just inside or along the lane markings 310, 312 for a total of five predetermined potential vehicle paths 314, 316, 318, 320, 322 associated with the lane 302.

In another example, lane 304 includes four potential vehicle paths. Potential vehicle path 324 lies close to the center of the lane 304 as established between lane marking 312 and curb 306. Potential vehicle paths 326, 328 are first predetermined as offsets from lane marking 312 and curb 306, respectively. Potential vehicle path 324 does not lie along the exact center of the lane 304 because the amount of offset from curb 306 to potential vehicle path 328 is greater than the amount of offset from lane marking 312 to potential vehicle path 326 to account for the type of lane feature present along the navigation route, and potential vehicle path 324 is configured to lie centrally between potential vehicle paths 326, 328. Lane 304 also includes potential vehicle path 322 positioned just inside or along the lane marking 312, the potential vehicle path 322 being common with lane 302. Lane 304 does not include a potential vehicle path along curb 306, as this type of lane feature cannot be safely traversed by the vehicle 200, so sufficient spacing is maintained from the curb 306 by not selecting a potential vehicle path proximate to the curb 306.

Figure 4:
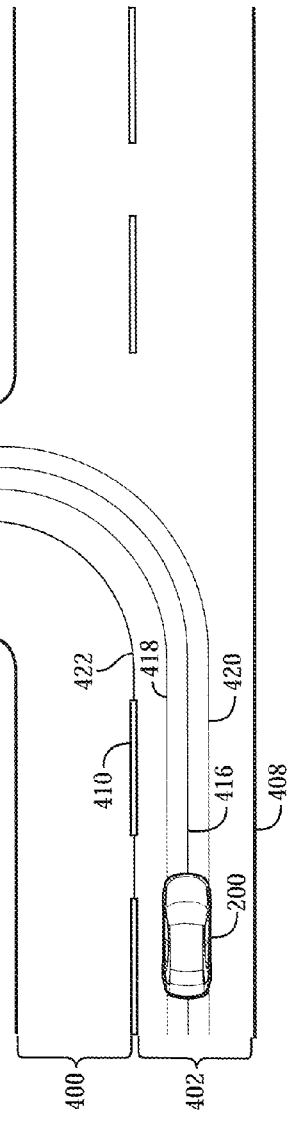
FIG. 4 shows another example portion of the navigation route being traversed by the vehicle of FIG. 2 and another example set of potential vehicle paths along the portion of the navigation route.

FIG. 4 shows another example portion of the navigation route being traversed by the vehicle 200 of FIG. 2 and another example set of potential vehicle paths along the portion of the navigation route. The example navigation route shown in FIG. 4 includes four lanes 400, 402, 404, 406 forming an intersection between two roads. Each of the lanes 400, 402, 404, 406 is formed between lane edge features, such as a curb 408 at the bottom edge of lane 402 and a dashed lane marking 410 forming the top of lane 402. Similarly, a curb 412 forms the right edge of lane 406 and a dashed lane marking 414 forms the left edge of lane 406. In the example navigation route of FIG. 4, the data analyzer 120 and path planner 122 can determine that the lanes 400, 402 are designed for two-way vehicular travel in opposing directions as are the lanes 404, 406. Further, the vehicle 200 traversing the example navigation route of FIG. 4 may transfer from lane 402 to lane 406 by making a left turn at approximately ninety degrees within the intersection of the four travel lanes 400, 402, 404, 406. Other transfers between the lanes 400, 402, 404, 406 are also possible but are not described here.

The data analyzer 120 and path planner 122 can also use map information including lane information to predetermine sets of potential vehicle paths. Given the example where the vehicle 200 is following a navigation route requiring a left turn from lane 402 to lane 406, four predetermined potential vehicles paths can be determined given the lane features present within the map information. Potential vehicle path 416 lies close to the center of the lanes 402, 406 as it exists between the lane marking 410 and the curb 408 as well as between the lane marking 414 and the curb 412. The vehicle 200 is shown as currently traversing this potential vehicle path 416 as it plans to transfer from lane 402 to lane 406. Potential vehicle paths 418, 420 are first predetermined as offsets from lane markings 410, 414 and curbs 408, 412. Lanes 402, 406 also include potential vehicle path 422 which is positioned just inside or along the lane markings 410, 414 for the total of four predetermined potential vehicle paths 416, 418, 420, 422 associated with the lanes 402, 406 as the vehicle 200 traverses the navigation route shown in FIG. 4.

FIG. 5 shows a plurality of objects proximate to the set of potential vehicle paths 314, 316, 318, 320, 322 of FIG. 3 and the vehicle of FIG. 2. As described above, the data analyzer 120 can identify and classify objects proximate to the vehicle 200 and/or the potential vehicle paths 314, 316, 318, 320, 322 while the vehicle 200 traverses the navigation route. Some objects proximate to the vehicle 200 are more important than others in determining which of the potential vehicle paths 314, 316, 318, 320, 322 is preferred for the vehicle 200 to follow along the navigation route. The important objects, or objects of interest, can be used in determining which of the predetermined potential vehicle paths 314, 316, 318, 320, 322 maintains a threshold distance to both the identified lane features and objects of interest in order to choose a preferred vehicle path from the potential vehicle paths 314, 316, 318, 320, 322. The threshold distance can vary depending on the type of lane feature (e.g. curb vs. lane marking) or the type of object of interest (e.g. pedestrian, moving vehicle, stationary vehicle) being analyzed.

For example, if an object can meet at least one of the following criteria, it is not likely to affect the evaluation of the potential vehicle paths 314, 316, 318, 320, 322: the object has a positive relative velocity in relation to the vehicle 200 or vice versa (e.g. the object is getting further away from the vehicle 200 or the vehicle 200 is getting further away from the object) and the distance to the object divided by the relative velocity of the object is greater than five (e.g. the time before the vehicle 200 and object are adjacent is greater than five seconds). Conversely, the opposite is true. An object having a negative relative velocity in respect to the vehicle 200 or a distance to relative velocity ratio under five can be classified by the data analyzer 120 or path planner 122 as an object of interest for use in choosing a preferred vehicle path from the potential vehicle paths 314, 316, 318, 320, 322. The path-selection algorithm can be based on maintaining a safe distance from both the relevant objects, the objects of interest, and the relevant lane features while excluding information related to irrelevant objects identified proximate to the vehicle 200 or potential vehicle paths 314, 316, 318, 320, 322.

In the example of FIG. 5, there are three objects proximate to the vehicle 200 and the potential vehicle paths 314, 316, 318, 320, 322: vehicle 500, vehicle 502, and vehicle 504. Vehicle 500 can be analyzed to determine that it is sufficiently distant from the potential vehicle paths 314, 316, 318, 320, 322 and traveling at sufficiently low relative velocity as to be excluded from the determination of the preferred vehicle path. Similarly, vehicle 502 can be analyzed to determine that it is traveling at a sufficiently greater positive relative velocity in respect to vehicle 200 as to be excluded from the determination of the preferred vehicle path. However, vehicle 504 can be found to be close in distance to the potential vehicle paths 314, 318 and 322, and the velocity and motion direction of the vehicles 200, 504 can be compared based on information collected by the sensors 116, to determine that vehicle 200 is closing the distance between itself and vehicle 504 such that vehicle 504 will be classified as an object of interest in determining which of the potential vehicle paths 314, 316, 318, 320, 322 will be chosen as the preferred vehicle path.

FIG. 6 shows a plurality of objects proximate to the set of potential vehicle paths 416, 418, 420, 422 of FIG. 4 and the vehicle 200 of FIG. 2. In this example, there are two objects proximate to the vehicle 200 and the potential vehicle paths 416, 418, 420, 422: vehicle 600 in lane 404 and vehicle 602 in lane 402. The data analyzer 120 or path planner 122 can determine that vehicle 602 is sufficiently distant from the vehicle 200 and the potential vehicle paths 416, 418, 420, 422 and traveling at sufficient relative velocity as to be excluded from the determination of the preferred vehicle path. However, the location and relative velocity of vehicle 600 in respect to vehicle 200 and vehicle paths 418, 422, as it extends out from lane 404 into lane 400 and is positioned very close to lane marking 414, can be determined to be sufficiently relevant to the potential vehicle paths 418, 422 such that vehicle 600 will be classified as an object of interest and used in determining which of the potential vehicle paths 416, 418, 420, 422 will be chosen as the preferred vehicle path when the vehicle 200 makes the transfer from lane 402 to lane 406.

Figure 7:
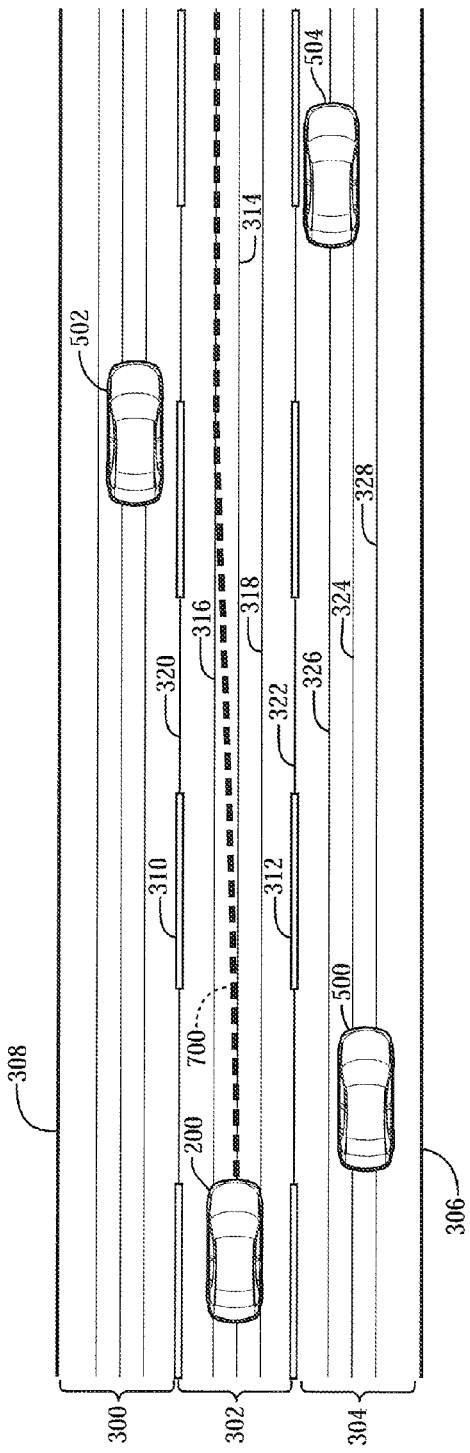
FIG. 7 shows an example preferred vehicle path chosen from the set of potential vehicle paths of FIG. 3 through the plurality of proximate objects of FIG. 5.

FIG. 7 shows an example preferred vehicle path 700 chosen from the set of potential vehicle paths 314, 316, 318, 320, 322 of FIG. 3 through the plurality of proximate objects of FIG. 5. The path planner 122 can be configured to evaluate the location and motion characteristics of the object of interest, in this example, vehicle 504, in choosing the preferred vehicle path 700. The preferred vehicle path 700 is shown in dotted line and first follows the current path being traversed by the vehicle, coincident with potential vehicle path 314, and then smoothly transitions to the potential vehicle path 316 in order to provide at least a threshold distance from the object of interest, vehicle 504. The potential vehicle path 316 is selected by the path planner 122 based both on maintaining a threshold distance from the vehicle 504 and on keeping the vehicle 200 as near to the center of its current travel lane 302 as possible. A benefit of using predetermined potential vehicle paths 314, 316, 318, 320, 322 is that the threshold distance to various lane features is also maintained while taking other objects of interest, such as vehicle 504, into account in computing a smooth transition for the vehicle 200.

The path planner 122 can also be configured to decelerate the vehicle 200 to avoid objects of interest if no potential vehicle paths 314, 316, 318, 320, 322 allow the vehicle 200 to maintain a threshold distance to the relevant objects of interest. Additionally, if no objects of interest are classified by the data analyzer 120 or path planner 122, a preferred vehicle path can be selected based solely on the lane information, for example, lane width and lane edge features, as this information is used to establish the potential vehicle paths 314, 316, 318, 320, 322. For example, if vehicle 504 were not present in the example navigation route of FIGS. 5 and 7, the vehicle 200 can be configured to maintain its central position in the lane 302 along potential vehicle path 314 as it follows the navigation route.

Figure 8:
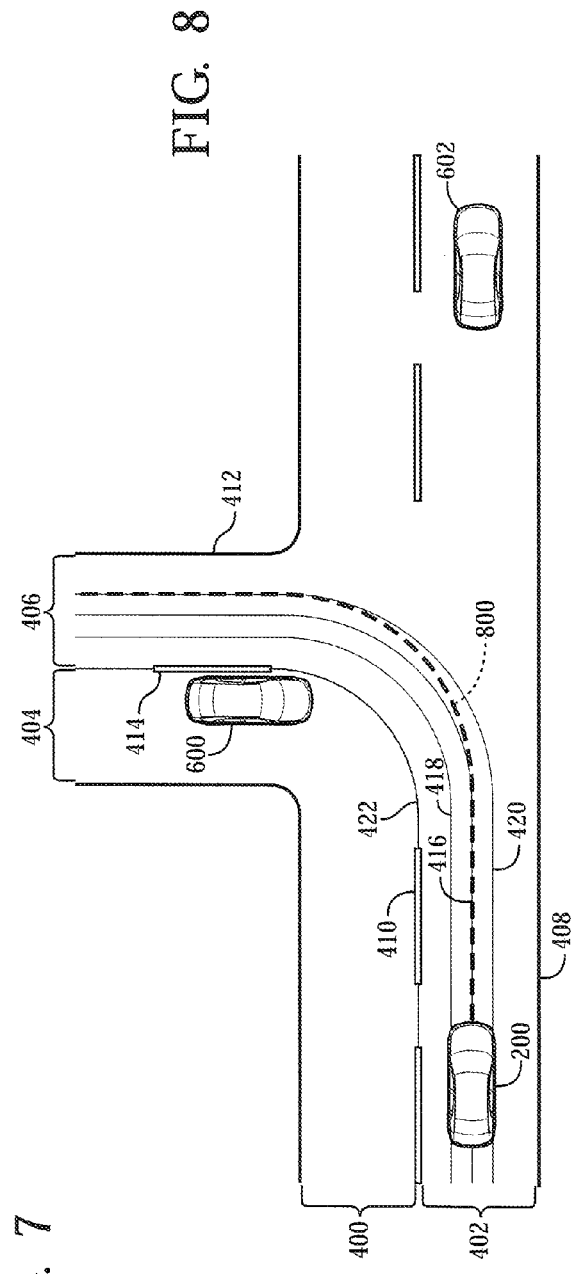
FIG. 8 shows an example preferred vehicle path chosen from the set of potential vehicle paths of FIG. 4 through the plurality of proximate objects of FIG. 6.

FIG. 8 shows an example preferred vehicle path 800 chosen from the set of potential vehicle paths 416, 418, 420, 422 of FIG. 4 through the plurality of proximate objects of FIG. 6. In this example, vehicle 600 is the only object of interest that is used by the path planner 122 in choosing the preferred vehicle path 800 as the vehicle 200 transfers from lane 402 to lane 406 by making a left turn. The preferred vehicle path 800 is shown in dotted line and first follows the current path being traversed by the vehicle, coincident with potential vehicle path 416, and then smoothly transitions to the potential vehicle path 420 in order to provide at least a threshold distance from the object of interest, vehicle 600. The potential vehicle path 420 is selected by the path planner 122 based both on maintaining a threshold distance from the vehicle 600 and on keeping the vehicle 200 as near to the center of its current new travel lane 406 as possible. In this example, the preferred vehicle path 420 is chosen such that vehicle 200 maintains a safe distance from vehicle 600 along the entire curvature of the turn.

Figure 9:
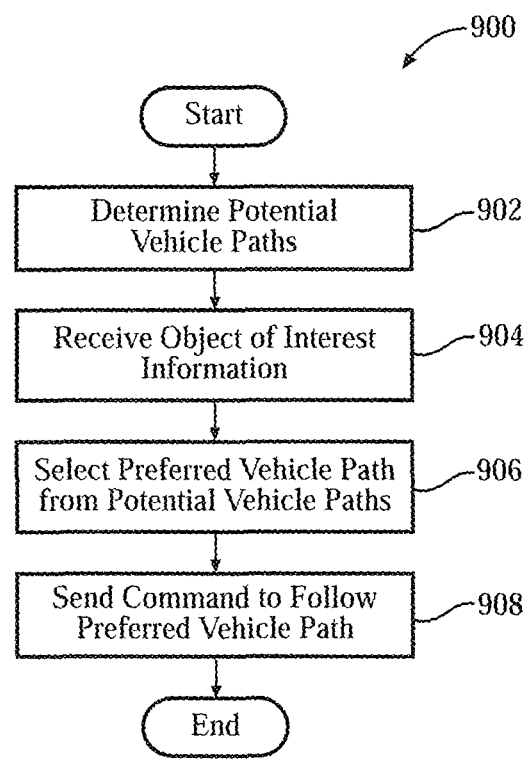
FIG. 9 is a logic flowchart of a process performed by the automated driving system.

FIG. 9 is a logic flowchart of a process 900 performed by the automated driving system. In step 902 of the process 900, the automated driving system can determine, based on information specific to the environment surrounding the vehicle 200, one or more potential vehicle paths, such as potential vehicle paths 314, 316, 318, 320, 322 as shown in FIG. 3 or potential vehicle paths 416, 418, 420, 422 shown in FIG. 4. As described above, the information specific to the environment can include lane information, such as the number of lanes, the width of each lane, and the edge features relevant to each lane. Edge features can include, for example, lane markings, curbs, transitions from pavement to another surface, or any other indicator that could be understood to denote the edge of a lane. The determination of the potential vehicle paths can also be based on the navigation route for the vehicle 200, that is, based on the automated driving system's understanding of the path that the vehicle 200 should follow to reach a given destination.

In step 904 of the process 900, the automated driving system can receive, based on input received from the one or more sensors 116 disposed on the vehicle 200, an indication classifying one or more objects proximate to the one or more potential vehicle paths as an object of interest. For example, the data analyzer 120 or path planner 122 applications can be configured to receive or process data from the sensors 116 to detect and and/or analyze one or more properties of the objects proximate to either the vehicle 200 or the potential vehicle paths. As described above, the properties of the detected objects analyzed can include relative speed in relation to the vehicle 200, relative motion direction in relation to the vehicle 200, relative distance from the vehicle 200, and relative distance from the one or more potential vehicle paths.

In step 906 of the process 900, the automated driving system can select, based on properties of the one or more objects of interest, a preferred vehicle path from the one or more potential vehicle paths. Depending on the outcome of the evaluation of the properties of the proximate objects, some of the objects will be excluded from the algorithm implemented to choose a preferred vehicle path, and other objects will be classified as objects of interest that will affect the choice of a preferred vehicle path. Alternatively, if no objects of interests are detected or classified, the automated driving system can be configured to select the preferred vehicle path based solely on the lane information and the one or more identified potential vehicle paths, with a preference to select the preferred vehicle path as the potential vehicle path that maintains the vehicle 200 in a central position within a given lane, for example, potential vehicle paths 314, 416 as associated with lanes 302, 402 in FIGS. 3 and 4.

In step 908 of the process 900, the automated driving system can send a command, to one or more vehicle systems 118, to control the vehicle 200 to follow the preferred vehicle path. The command can be sufficient to modify the path of the vehicle 200 when the vehicle 200 is proximate to the one or more objects of interest, allowing the vehicle 200 to return to another potential vehicle path when the object of interest is cleared. For example, as shown in FIG. 7, vehicle 200 transitions smoothly from the potential vehicle path 314 to the potential vehicle path 316 along preferred vehicle path 700 based on maintaining a threshold distance to the relative location of the object of interest, vehicle 504, given the relative velocity between the vehicle 200 and the object of interest. The vehicle systems 118 that implement this transition can include, for example, the steering system and the suspension system. In another example, as shown in FIG. 8, vehicle 200 makes a left turn from lane 402 to lane 406, transitioning from potential vehicle path 416 to potential vehicle path 420 along preferred vehicle path 800 based on the relative location and velocity of the object of interest, vehicle 600. The vehicle systems 118 that implement this transition can include, for example, the braking system, the steering system, and the suspension system. After step 908, the process 900 ends.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. For example, in the embodiments described above, the vehicle 200 is generally described as an automobile. However, the vehicle 200 is not limited to an automobile, as the automated driving system could also be implemented with other vehicles generally controlled by a driver, or operator, such as airplanes, boats, etc. The scope of the claims is to be accorded the broadest interpretation so as to encompass all such modifications and equivalent structures as is permitted under the law.

What is claimed is:

1. An automated driving system, comprising:
one or more sensors disposed on a vehicle; and
a computing device in communication with the one or more sensors, comprising:
one or more processors for controlling the operations of the computing device; and
a memory for storing data and program instructions used by the one or more processors, wherein the one or more processors are configured to execute instructions stored in the memory to:
determine, based on information specific to the environment surrounding the vehicle, a plurality of potential vehicle paths along a navigation route ahead of the vehicle;
receive, based on input from the one or more sensors disposed on the vehicle, an indication classifying one or more objects proximate to the plurality of potential vehicle paths as an object of interest;
select, based on properties of the one or more objects of interest, a preferred vehicle path from the plurality of potential vehicle paths that maintains a threshold distance to the one or more objects of interest; and
send a command, to one or more vehicle systems, to control the vehicle to transition from its current path and follow the preferred vehicle path along the navigational route.

2. The system of claim 1, wherein the information specific to the environment surrounding the vehicle includes lane information, the lane information including at least one of lane number and lane width and lane edge feature.

3. The system of claim 1, wherein determining the plurality of potential vehicle paths is further based on a navigation route of the vehicle.

4. The system of claim 1, wherein classifying the one or more objects proximate to the plurality of potential vehicles paths as an object of interest includes detecting and analyzing the one or more properties of the one or more objects proximate to the plurality of potential vehicles paths, the one or more properties of the one or more objects of interest including at least one of:
relative speed and relative motion direction in relation to the vehicle, and
at least one of relative distance from the vehicle and from the plurality of potential vehicle paths.

5. The system of claim 2, wherein the one or more processors are further configured to:
select, if no objects of interest are classified, a preferred vehicle path based on the plurality of potential vehicle paths and the lane information.

6. A computer-implemented method of automated driving, comprising:
determining, based on information specific to the environment surrounding a vehicle, a plurality of potential vehicle paths along a navigation route ahead of the vehicle;
receiving, based on input received from one or more sensors disposed on the vehicle, an indication classifying one or more objects proximate to the plurality of potential vehicle paths as an object of interest;
selecting, based on properties of the one or more objects of interest, a preferred vehicle path from the plurality of potential vehicle paths that maintains a threshold distance to the one or more objects of interest; and
sending a command, to one or more vehicle systems, to control the vehicle to transition from its current path and follow the preferred vehicle path along the navigational route.

7. The method of claim 6, wherein the information specific to the environment surrounding the vehicle includes lane information, the lane information including at least one of lane number and lane width and lane edge feature.

8. The method of claim 6, wherein determining the plurality of potential vehicle paths is further based on a navigation route of the vehicle.

9. The method of claim 6, wherein classifying the one or more objects proximate to the plurality of vehicles paths as an object of interest includes detecting and analyzing the one or more properties of the one or more objects proximate to the plurality of vehicles paths, the one or more properties of the one or more objects of interest including at least one of:
   relative speed and relative motion direction in relation to the vehicle, and
   at least one of relative distance from the vehicle and from the plurality of potential vehicle paths.

10. The method of claim 7, further comprising:
    selecting, if no objects of interest are classified, a preferred vehicle path based on the plurality of potential vehicle paths and the lane information.

11. A computing device, comprising:
    one or more processors for controlling the operations of the computing device; and
    a memory for storing data and program instructions used by the one or more processors, wherein the one or more processors are configured to execute instructions stored in the memory to:
      determine, based on information specific to the environment surrounding a vehicle, a plurality of potential vehicle paths along a navigation route ahead of the vehicle;
      receive, based on input received from one or more sensors disposed on the vehicle, an indication classifying one or more objects proximate to the plurality of potential vehicle paths as an object of interest;
      select, based on properties of the one or more objects of interest, a preferred vehicle path from the plurality of potential vehicle paths that maintains a threshold distance to the one or more objects of interest; and
      send a command, to one or more vehicle systems, to control the vehicle to transition from its current path and follow the preferred vehicle path along the navigational route.

12. The computing device of claim 11, wherein the information specific to the environment surrounding the vehicle includes lane information, the lane information including at least one of lane number and lane width and lane edge feature.

13. The computing device of claim 11, wherein determining the plurality of potential vehicle paths is further based on a navigation route of the vehicle.

14. The computing device of claim 11, wherein classifying the one or more objects proximate to the plurality of vehicles paths as an object of interest includes detecting and analyzing the one or more properties of the one or more objects proximate to the plurality of vehicles paths, the one or more properties of the one or more objects of interest including at least one of:
    relative speed and relative motion direction in relation to the vehicle, and
    at least one of relative distance from the vehicle and from the plurality of potential vehicle paths.

15. The computing device of claim 12, wherein the one or more processors are further configured to:
    select, if no objects of interest are classified, a preferred vehicle path based on the plurality of potential vehicle paths and the lane information.

16. The system of claim 1, wherein the information specific to the environment surrounding the vehicle includes lane information, the lane information including lane edge features for a lane in the navigation route, and wherein each of the plurality of potential vehicle paths maintains a threshold distance to the lane edge features.

17. The system of claim 16, wherein one of the plurality of potential vehicle paths is determined, based on the lane edge features, as central to the lane, and at least some of the remainder of the plurality of potential vehicle paths are determined, based on the lane edge features, as offsets from the lane edge features.

18. The system of claim 16, wherein the preferred vehicle path is closest to the center of the lane.

19. The method of claim 6, wherein the information specific to the environment surrounding the vehicle includes lane information, the lane information including lane edge features for a lane in the navigation route, and wherein each of the plurality of potential vehicle paths maintains a threshold distance to the lane edge features.

20. The method of claim 19, wherein one of the plurality of potential vehicle paths is determined, based on the lane edge features, as central to the lane, and at least some of the remainder of the plurality of potential vehicle paths are determined, based on the lane edge features, as offsets from the lane edge features.

21. The method of claim 19, wherein the preferred vehicle path is closest to the center of the lane.

22. The computing device of claim 11, wherein the information specific to the environment surrounding the vehicle includes lane information, the lane information including lane edge features for a lane in the navigation route, and wherein each of the plurality of potential vehicle paths maintains a threshold distance to the lane edge features.

23. The computing device of claim 22, wherein one of the plurality of potential vehicle paths is determined, based on the lane edge features, as central to the lane, and at least some of the remainder of the plurality of potential vehicle paths are determined, based on the lane edge features, as offsets from the lane edge features.

24. The computing device of claim 22, wherein the preferred vehicle path is closest to the center of the lane.

* * * * *